United States Patent
Yang et al.

(10) Patent No.: US 12,199,521 B2
(45) Date of Patent: Jan. 14, 2025

(54) SYNCHRONOUS FULL-BRIDGE RECTIFIER CIRCUIT AND RECTIFIER SWITCH CONTROLLER THEREOF

(71) Applicant: Richtek Technology Corporation, Zhubei (TW)

(72) Inventors: Ta-Yung Yang, Taoyuan (TW); Yu-Chang Chen, Nantou (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 388 days.

(21) Appl. No.: 17/840,540

(22) Filed: Jun. 14, 2022

(65) Prior Publication Data

US 2023/0216425 A1 Jul. 6, 2023

Related U.S. Application Data

(60) Provisional application No. 63/296,406, filed on Jan. 4, 2022.

(51) Int. Cl.
*H02M 7/219* (2006.01)
*H02M 1/00* (2006.01)
*H02M 1/08* (2006.01)
*H02M 1/38* (2007.01)

(52) U.S. Cl.
CPC ......... *H02M 7/219* (2013.01); *H02M 1/0003* (2021.05); *H02M 1/08* (2013.01); *H02M 1/38* (2013.01); *H02M 7/2195* (2021.05)

(58) Field of Classification Search
CPC .... H02M 1/0003; H02M 1/38; H02M 7/2195; H02M 7/219
See application file for complete search history.

(56) References Cited

U.S. PATENT DOCUMENTS

| | | | |
|---|---|---|---|
| 2016/0043657 A1* | 2/2016 | Mauder | H02M 7/219 363/127 |
| 2017/0264211 A1* | 9/2017 | Christiaans | H02M 7/219 |
| 2018/0123473 A1* | 5/2018 | Lee | H02M 7/219 |

* cited by examiner

*Primary Examiner* — Kyle J Moody
*Assistant Examiner* — Jye-June Lee
(74) *Attorney, Agent, or Firm* — Tung & Associates

(57) ABSTRACT

A synchronous full-bridge rectifier circuit includes: a first high-side transistor, a first low-side transistor, a second high-side transistor and a second low-side transistor which are configured to generate a DC power source from an AC power source, wherein the first high-side transistor and the first low-side transistor are coupled to a live wire of the AC power source, and the second high-side transistor and the second low-side transistor are coupled to a neutral wire of the AC power source; a first detection transistor, coupled to the live wire and configured to generate a first detection signal; and a second detection transistor, coupled to the neutral wire configured to generate a second detection signal; wherein the first low-side transistor is turned on after the body-diode of the first low-side transistor is turned on; the second low-side transistor is turned on after the body-diode of the second low-side transistor is turned on.

35 Claims, 10 Drawing Sheets

SYNCHRONOUS FULL-BRIDGE RECTIFIER CIRCUIT AND RECTIFIER SWITCH CONTROLLER THEREOF

CROSS REFERENCE

The present invention claims priority to following provisional applications, Ser. No. 63/296,406, filed on Jan. 4, 2022.

BACKGROUND OF THE INVENTION

Field of Invention

The present invention relates to a full-bridge rectifier circuit; particularly, it relates to a synchronous full-bridge rectifier circuit utilizing transistors. The present invention also relates to a rectifier switch controller which is configured to prevent the synchronous full-bridge rectifier circuit from short-through damage.

Description of Related Art

For AC-to-DC (alternating current to direct current) power supplies, a typical bridge rectifier consisting of 4 rectifier diodes is commonly applied to rectify the AC power source VAC to a DC power source VBD. However, due the forward voltage-drop of the rectifier diodes are high, usually higher than 1V at high current conditions, the power loss of the full-bridge rectifier is significant.

In order to achieve high efficiency power conversion for saving power and reducing the heat, transistors (such as MOSFETs) can be utilized to replace rectifier diodes. In addition, the rectifier switch controller of the present invention prevents the transistors from damages caused by possible short-through during abnormal conditions such as lightening surge or ESD, and etc.

SUMMARY OF THE INVENTION

From one perspective, the present invention provides a synchronous full-bridge rectifier circuit comprising: a first high-side transistor, a first low-side transistor, a second high-side transistor and a second low-side transistor which are configured to operably generate a DC power source from an AC power source, wherein the first high-side transistor and the first low-side transistor are connected and coupled to a live wire of the AC power source, and the second high-side transistor and the second low-side transistor are connected and coupled to a neutral wire of the AC power source; a first detection transistor, coupled to the live wire and configured to operably generate a first detection signal; a second detection transistor, coupled to the neutral wire configured to operably generate a second detection signal; and a switching control circuit, configured to operably generate a first driving signal, a second driving signal, a third driving signal and a fourth driving signal according to the first detection signal and the second detection signal; wherein the first driving signal is configured to operably control the first high-side transistor; the second driving signal is configured to operably control the second high-side transistor; the third driving signal is configured to operably control the second low-side transistor; the fourth driving signal is configured to operably control the first low-side transistor; wherein the first low-side transistor is turned on after the body-diode of the first low-side transistor is turned on; the second low-side transistor is turned on after the body-diode of the second low-side transistor is turned on.

In one preferred embodiment, a maximum voltage of the first detection signal and a maximum voltage of the second detection voltage are clamped to be not more than a clamping voltage.

In one preferred embodiment, the first driving signal is enabled to turn on the first high-side transistor after the third driving signal is enabled, and the second driving signal is enabled to turn on the second high-side transistor after the fourth driving signal is enabled.

In one preferred embodiment, the first low-side transistor is turned off when the current flowed from the neutral wire to the live wire is lower than a first detection current threshold.

In one preferred embodiment, the second low-side transistor is turned off when the current flowed from the live wire to the neutral wire is lower than a second detection current threshold.

In one preferred embodiment, the first low-side transistor is turned off when there is a current flowed from the live wire to the neutral wire; wherein the second low-side transistor is turned off when there is a current flowed from the neutral wire to the live wire.

In one preferred embodiment, the first low-side transistor is turned off when there is a current flowed from a drain terminal of the first low-side transistor to a source terminal of the first low-side transistor; wherein the second low-side transistor is turned off when there is a current flowed from a drain terminal of the second low-side transistor to a source terminal of the second low-side transistor.

In one preferred embodiment, the first low-side transistor is allowed be turned on when the voltage of the first detection signal is lower than a first low-side voltage threshold.

In one preferred embodiment, the second low-side transistor is allowed be turned on when the voltage of the second detection signal is lower than a second low-side voltage threshold.

In one preferred embodiment, the second low-side transistor is allowed be turned on when the voltage of the first detection signal is higher than a first detection voltage threshold; wherein the first low-side transistor is allowed be turned on when the voltage of the second detection signal is higher than a second detection voltage threshold.

In one preferred embodiment, the second low-side transistor is turned off when the voltage of the first detection signal is lower than the first detection voltage threshold; wherein the first low-side transistor is turned off when the voltage of the second detection signal is lower than the second detection voltage threshold.

In one preferred embodiment, the first detection transistor is allowed be turned on when the voltage of the first detection signal is lower than the first detection voltage threshold; wherein the second detection transistor is allowed be turned on when the voltage of the second detection signal is lower than the second detection voltage threshold.

In one preferred embodiment, the first high-side transistor, the first low-side transistor, the second high-side transistor and the second low-side transistor are turned off when the pulse width of the third driving signal or the fourth driving signal is shorter than a period threshold; wherein the pulse width of the third driving signal or the fourth driving signal being shorter than the period threshold indicates a load consuming the DC power source is lower than a load threshold.

In one preferred embodiment, the first high-side transistor, the first low-side transistor, the second high-side transistor and the second low-side transistor are turned off when an enable signal is disabled during a light load condition.

In one preferred embodiment, the first detection transistor or the second detection transistor is a MOSFET.

In one preferred embodiment, the synchronous full-bridge rectifier circuit further comprising a first clamping transistor which is cascoded between the first detection transistor and the live wire such that the maximum voltage of the first detection signal is clamped to be not more than the clamping voltage, wherein the first clamping transistor is a JFET, wherein the clamping voltage is lower than a maximum rating voltage of the first detection transistor; and/or wherein the synchronous full-bridge rectifier circuit further comprising a second clamping transistor which is cascoded between the second detection transistor and the neutral wire such that the maximum voltage of the first detection signal is clamped to be not more than the clamping voltage, wherein the second clamping transistor is a JFET, wherein the clamping voltage is lower than a maximum rating voltage of the second detection transistor.

From another perspective, the present invention provides a rectifier switch controller for use in controlling a synchronous full-bridge rectifier circuit which includes: a first high-side transistor, a first low-side transistor, a second high-side transistor and a second low-side transistor which are configured to operably generate a DC power source from an AC power source, wherein the first high-side transistor and the first low-side transistor are connected and coupled to a live wire of the AC power source, and the second high-side transistor and the second low-side transistor are connected and coupled to a neutral wire of the AC power source, the rectifier switch controller comprising: a first detection transistor, coupled to the live wire and configured to operably generate a first detection signal; a second detection transistor, coupled to the neutral wire configured to operably generate a second detection signal; and a first detection circuit, configured to compare the first detection signal with at least one first reference signal to generate at least one first comparison signal correspondingly; a second detection circuit, configured to compare the second detection signal with at least one second reference signal to generate at least one second comparison signal correspondingly; a first decision circuit, configured to operably generate a first low-side control signal according to the at least one first comparison signal and the at least one second comparison signal, wherein an on-time of the first low-side transistor is determined according to the first low-side control signal; a second decision circuit, configured to operably generate a second low-side control signal according to the at least one second comparison signal and the at least one first comparison signal, wherein an on-time of the second low-side transistor is determined according to the first low-side control signal; and a timing control circuit, configured to operably generate a first driving signal, a second driving signal, a third driving signal and a fourth driving signal according to the first low-side control signal and the second low-side control signal; wherein the first driving signal is configured to operably control the first high-side transistor; the second driving signal is configured to operably control the second high-side transistor; the third driving signal is configured to operably control the second low-side transistor; the fourth driving signal is configured to operably control the first low-side transistor; wherein the first low-side transistor is turned on after the body-diode of the first low-side transistor is turned on; the second low-side transistor is turned on after the body-diode of the second low-side transistor is turned on.

In one preferred embodiment, the first driving signal is enabled to turn on the first high-side transistor after the third driving signal is enabled, and the second driving signal is enabled to turn on the second high-side transistor after the fourth driving signal is enabled.

In one preferred embodiment, the first detection circuit is configured to compare the first detection signal with a middle voltage threshold, wherein the first low-side transistor is turned off when the first detection signal is higher than the middle voltage threshold, which indicates that a current flowed from the neutral wire to the live wire is lower than a first detection current threshold.

In one preferred embodiment, the second detection circuit is configured to compare the second detection signal with a middle voltage threshold, wherein the second low-side transistor is turned off when the second detection signal is higher than the middle voltage threshold, which indicates that a current flowed from the live wire to the neutral wire is lower than a second detection current threshold.

In one preferred embodiment, the second detection circuit is configured to compare the second detection signal with a second detection voltage threshold, wherein the first low-side transistor is turned off when the second detection signal is lower than the second detection voltage threshold, which indicates that there is a current flowed from the live wire to the neutral wire; wherein the first detection circuit is configured to compare the first detection signal with a first detection voltage threshold, wherein the second low-side transistor is turned off when the first detection signal is lower than the first detection voltage threshold, which indicates that there is a current flowed from the neutral wire to the live wire.

In one preferred embodiment, the first detection circuit is configured to compare the first detection signal with a first low-side voltage threshold, wherein the first low-side transistor is turned off when there is a current flowed from a drain terminal of the first low-side transistor to a source terminal of the first low-side transistor; wherein the second detection circuit is configured to compare a second detection signal with the second low-side voltage threshold, wherein the second low-side transistor is turned off when there is a current flowed from a drain terminal of the second low-side transistor to a source terminal of the second low-side transistor.

In one preferred embodiment, the first detection circuit is configured to compare the first detection signal with a first low-side voltage threshold, wherein the first low-side transistor is allowed be turned on when the voltage of the first detection signal is lower than the first low-side voltage threshold.

In one preferred embodiment, the second detection circuit is configured to compare a second detection signal with a second low-side voltage threshold, wherein the second low-side transistor is allowed be turned on when the voltage of the second detection signal is lower than the second low-side voltage threshold.

In one preferred embodiment, the second detection circuit is configured to compare the second detection signal with a second detection voltage threshold, wherein the first low-side transistor is allowed be turned on when the voltage of the second detection signal is higher than the second detection voltage threshold.

In one preferred embodiment, the first detection circuit is configured to compare the first detection signal with a first detection voltage threshold, wherein the second low-side transistor is allowed be turned on when the voltage of the first detection signal is higher than the first detection voltage threshold.

In one preferred embodiment, the first detection circuit is configured to compare the first detection signal with a first detection voltage threshold, wherein the second detection circuit is configured to compare the second detection signal with a second detection voltage threshold, wherein the first detection transistor is allowed be turned on when the voltage of the first detection signal is lower than the first detection voltage threshold; wherein the second detection transistor is allowed be turned on when the voltage of the second detection signal is lower than the second detection voltage threshold.

In one preferred embodiment, the timing circuit includes at least one timer which is configured to count a pulse width of the third driving signal or the fourth driving signal according to a clock signal, wherein the first high-side transistor, the first low-side transistor, the second high-side transistor and the second low-side transistor are turned off when the pulse width of the third driving signal or the fourth driving signal is shorter than a period threshold provided by the at least one timer; wherein the pulse width of the third driving signal or the fourth driving signal being shorter than the period threshold indicates a load consuming the DC power source is lower than a load threshold.

In one preferred embodiment, the rectifier switch controller further comprises a first clamping transistor which is cascoded between the first detection transistor and the live wire such that the maximum voltage of the first detection signal is clamped to be not more than the clamping voltage, wherein the first clamping transistor is a JFET, wherein the clamping voltage is lower than a maximum rating voltage of the first detection transistor; and/or wherein the rectifier switch controller further comprises a second clamping transistor which is cascoded between the second detection transistor and the neutral wire such that the maximum voltage of the first detection signal is clamped to be not more than the clamping voltage, wherein the second clamping transistor is a JFET, wherein the clamping voltage is lower than a maximum rating voltage of the second detection transistor.

In one preferred embodiment, the first detection circuit is configured to further compare the first detection signal with a middle voltage threshold, and compare the first detection signal with a first low-side voltage threshold, wherein the first low-side transistor is turned on when the voltage of the second detection signal is higher than the second detection voltage threshold, the first detection signal is lower than the middle voltage threshold, and the voltage of the first detection signal is lower than the first low-side voltage threshold.

In one preferred embodiment, the second detection circuit is configured to further compare the second detection signal with a middle voltage threshold, and compare the second detection signal with a second low-side voltage threshold, wherein the second low-side transistor is turned on when the voltage of the first detection signal is lower than the first detection voltage threshold, the second detection signal is lower than the middle voltage threshold, and the voltage of the second detection signal is lower than the second low-side voltage threshold.

In one preferred embodiment, the first decision circuit prevents both the first low-side transistor and the second low-side transistor turning on at the same time according to the at least one second comparison signal, wherein the second decision circuit prevents both the first low-side transistor and the second low-side transistor turning on at the same time according to the at least one first comparison signal.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
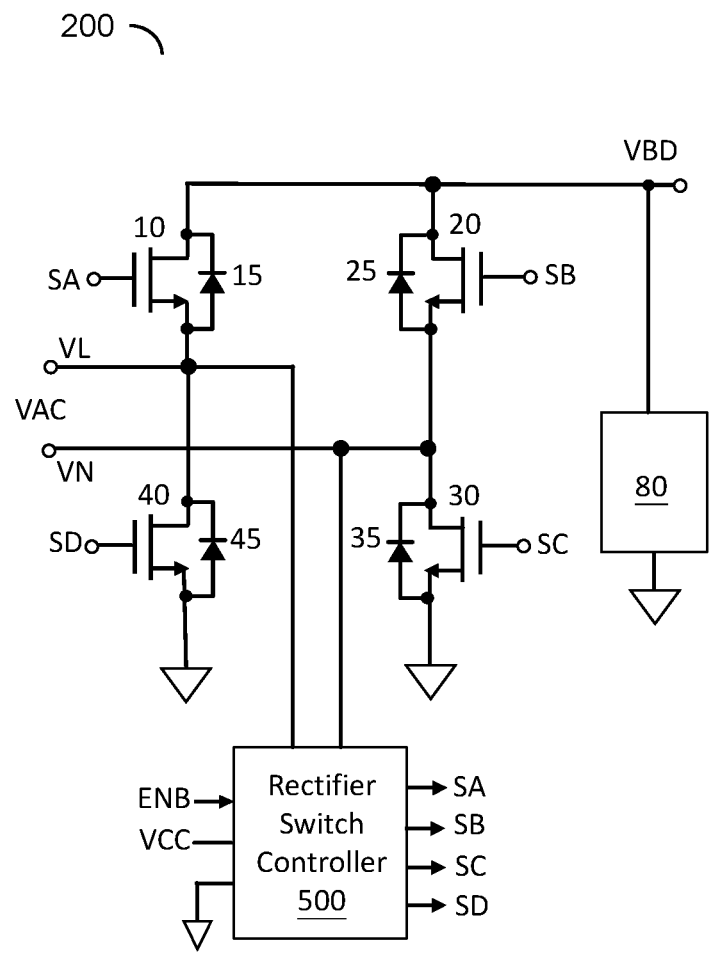
FIG. 1 shows a schematic diagram of a preferred embodiment of the synchronous full-bridge rectifier circuit according to the present invention.

FIG. 1 shows a schematic diagram of a preferred embodiment of the synchronous full-bridge rectifier circuit according to the present invention. The synchronous full-bridge rectifier circuit 200 comprises a first high-side transistor 10, a first low-side transistor 40, a second high-side transistor 20 and a second low-side transistor 30 which are configured to form a full-bridge rectifier for generating a DC power source VBD from an AC power source VAC. The DC power source VBD provides power to a resistive load 80. In one embodiment, the resistive load 80 can be a PFC (power factor correction) converter. The first high-side transistor 10 and the first low-side transistor 40 are connected and coupled to a live wire VL of the AC power source VAC. The second high-side transistor 20 and the second low-side transistor 30 are connected and coupled to a neutral wire VN of the AC power source VAC.

Still referring to FIG. 1, the first high-side transistor 10 has a body diode 15. The first low-side transistor 40 has a body diode 45. The second high-side transistor 20 has a body diode 25. The second low-side transistor 30 has a body diode 35. Operations of these transistors and body diodes are to be explained in detail hereafter.

Still referring to FIG. 1, the synchronous full-bridge rectifier circuit 200 further comprises a rectifier switch controller 500. The rectifier switch controller 500 receives an enable signal ENB, and generates a first driving signal SA, a second driving signal SB, a third driving signal SC and a fourth driving signal SD according to signal states of the live wire VL and the neutral wire VN. The signal states of the live wire VL and the neutral wire VN are for example voltages or current, which will be explained hereafter. The enable signal ENB is disabled during the light load and the no load conditions. In one embodiment, the first high-side transistor 10, the first low-side transistor 40, the second high-side transistor 20 and the second low-side transistor 30 are controlled to be off when the enable signal ENB is disabled. The first driving signal SA is configured to operably control the first high-side transistor 10. The second driving signal SB is configured to operably control the second high-side transistor 20. The third driving signal SC is configured to operably control the second low-side transistor 30. The fourth driving signal SD is configured to operably control the first low-side transistor 40.

Figure 2:
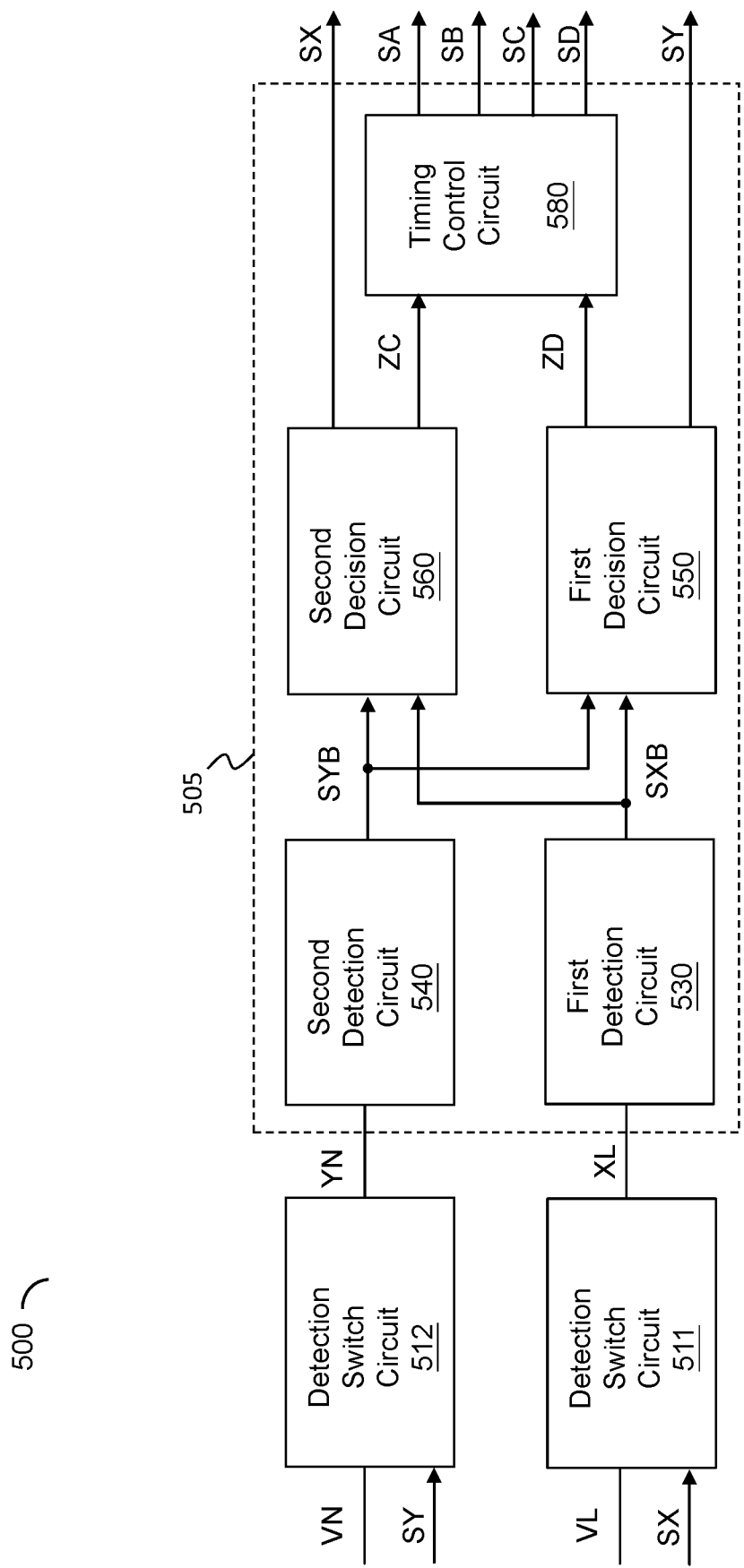
FIG. 2 shows a block diagram of a preferred embodiment of the rectifier switch controller according to the present invention.

FIG. 2 shows a block diagram of a preferred embodiment of the rectifier switch controller according to the present invention. The rectifier switch controller 500 includes a first detection switch circuit 511, a second detection switch circuit 512, a first detection circuit 530, a second detection circuit 540, a first decision circuit 550, a second decision circuit 560, and a timing control circuit 580.

The first detection switch circuit 511 is configured to be coupled to the live wire VL to generate a first detection signal XL according to a first detection control signal SX. The second detection switch circuit 512 is configured to be coupled to the neutral wire VN to generate a second detection signal YN according to a second detection control signal SY.

The first detection circuit 530 is configured to compare the first detection signal XL with at least one first reference signal to generate at least one first comparison signal (SXB) correspondingly. The second detection circuit 540 is configured to compare the second detection signal YN with at least one second reference signal to generate at least one second comparison signal (SYB) correspondingly.

The first decision circuit 550 is configured to operably generate a first low-side control signal ZD according to the at least one first comparison signal SXB and the at least one second comparison signal SYB, wherein an on-time of the first low-side transistor 40 is determined according to the first low-side control signal ZD. The second decision circuit 560 is configured to operably generate a second low-side control signal ZC according to the at least one second comparison signal SYB and the at least one first comparison signal SXB, wherein an on-time of the second low-side transistor 30 is determined according to the second low-side control signal ZC.

The timing control circuit 580 is configured to operably generate the first driving signal SA, the second driving signal SB, the third driving signal SC and the fourth driving signal SD according to the first low-side control signal ZD and the second low-side control signal ZC. In one embodiment, the first detection circuit 530, the second detection circuit 540, the first decision circuit 550, the second decision circuit 560, and the timing control circuit 580 can be configured as a switching control circuit 505 as shown in FIG. 2.

Figure 3:
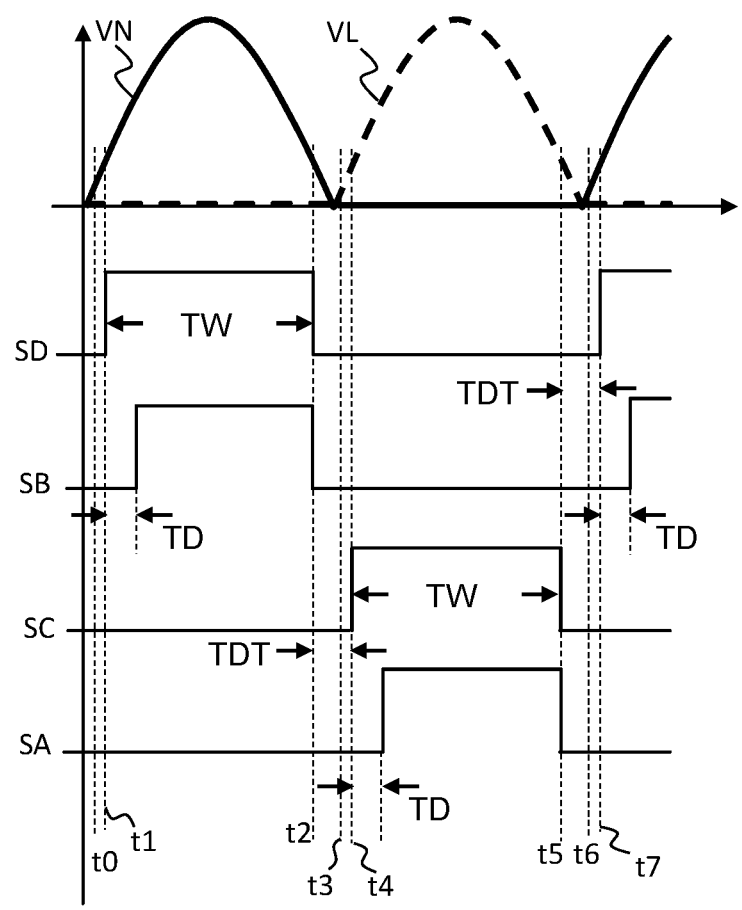
FIG. 3 shows operation waveforms of a preferred embodiment of the synchronous full-bridge rectifier circuit according to the present invention.
Figure 4:
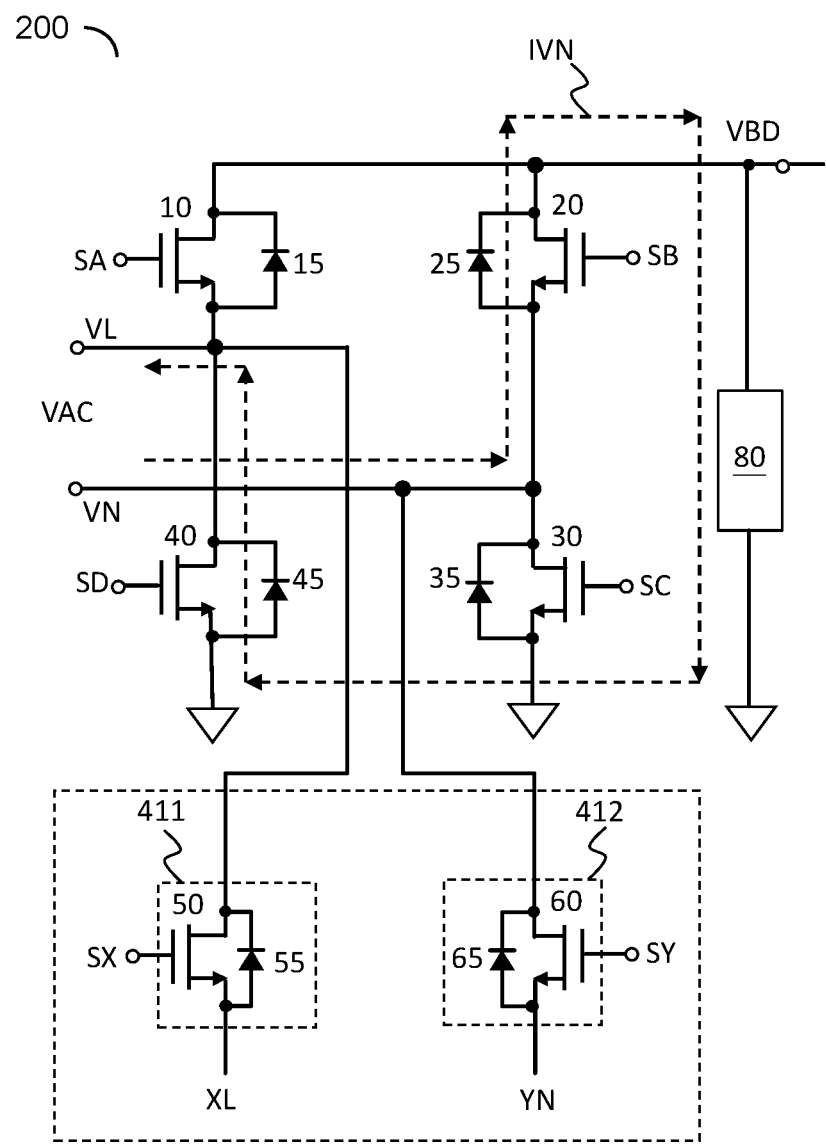
FIG. 4 shows a schematic diagram with current flow of one specific embodiment of the synchronous full-bridge rectifier circuit according to the present invention.
Figure 5:
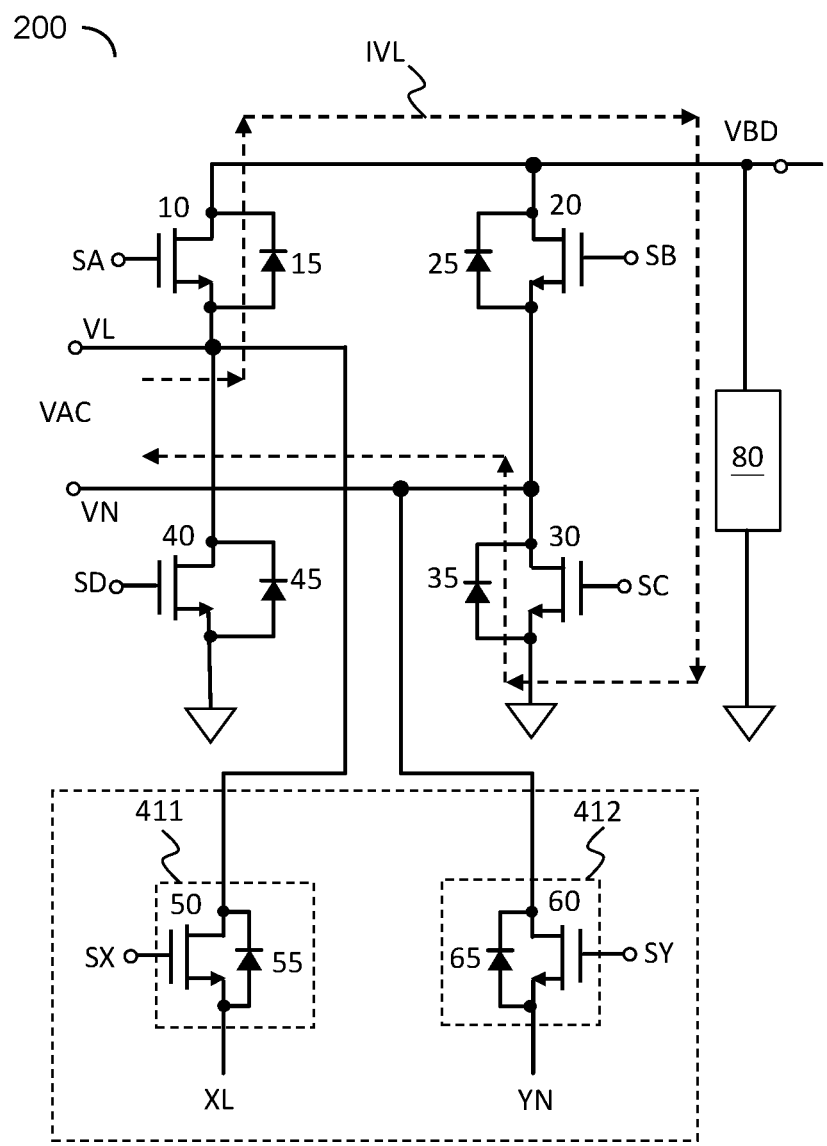
FIG. 5 shows a schematic diagram with current flow of one specific embodiment of the synchronous full-bridge rectifier circuit according to the present invention.

FIG. 3 shows an embodiment of operation waveforms of the synchronous full-bridge rectifier circuit according to the present invention. FIG. 4 and FIG. 5 show currents flowing from the neutral wire VN to the live wire VL and from the live wire VL to the neutral wire VN respectively according to embodiments of the present invention.

As shown in FIG. 4, in one embodiment, the first detection switch circuit 411 (corresponding to the first detection switch circuit 511 in FIG. 2) includes a first detection transistor 50, and the second detection switch circuit 412 (corresponding to the second detection switch circuit 512 in FIG. 2) includes a second detection transistor 60. The first detection transistor 50 has a body diode 55, and the second detection transistor 60 has a body diode 65.

The first detection transistor 50 is coupled to the live wire VL for generating a first detection signal XL. The second detection transistor 60 is coupled to the neutral wire VN for generating a second detection signal YN. In one embodiment, the first detection transistor 50 and the second detection transistor 60 can be MOSFETs. The maximum voltage of the first detection signal XL and the maximum voltage of the second detection voltage YN are clamped under a clamping voltage. In one embodiment, the clamping voltage can be for example the supply voltage VCC of the rectifier switch controller 500.

In one embodiment, the first low-side transistor 40 is turned on after the body-diode 45 of the first low-side transistor 40 is turned on. The second low-side transistor 30 is turned on after the body-diode 35 of the second low-side transistor 30 is turned on. Consequently, the first high-side transistor 10, the first low-side transistor 40, the second high-side transistor 20 and the second low-side transistor 30 are turned on under the zero-voltage switching (ZVS), thereby the switching loss is low.

Referring to FIG. 3-FIG. 5, exemplary operations along the time axis are explained as the following.

t0-t1: a current is started to flow from the neutral wire VN to the live wire VL (also referring to FIG. 4). The first driving signal SA, the second driving signal SB, the third driving signal SC and the fourth driving signal SD are still disabled. In other words, transistors 10, 20, 30 and 40 are controlled to be OFF. The body diode 25 and the body diode 45 are turned on when the current starts. The first detection transistor 50 is turned on because the voltage of the first detection signal XL is lower than a first detection voltage threshold, which indicates a current starts to flow through the body diode 45. The level of the first detection signal XL is lower than a first low-side voltage threshold.

t1: the voltage of the second detection signal YN is higher than a second detection voltage threshold, and the level of the first detection signal XL is lower than the first low-side voltage threshold. Therefore, the fourth driving signal SD is enabled to turn on the first low-side transistor 40, since there is no current flowing through the second low-side transistor 30 (YN being higher than a second detection voltage threshold) and a sufficiently large current starts to flow through the body diode 45. Note that it is prevented to turn on both the first low-side transistor 40 and the second low-side transistor 30 at the same time.

t1-t2: the fourth driving signal SD is enabled to turn on the first low-side transistor 40 for a pulse width TW. Once the fourth driving signal SD is enabled and after a delay TD, the second driving signal SB is enabled to turn on the second high-side transistor 20. A current IVN will flow from the neutral wire VN sequentially through the second high-side transistor 20, the DC power source VBD, the resistive load 80, ground, the first low-side transistor 40, and the live wire VL (as shown in FIG. 4). The current IVN and the on-resistance R40 of the first low-side transistor 40 generates a negative drain-source voltage of the first low-side transistor 40 during t1-t2. The first low-side transistor 40 is turned off when the current IVN is lower than a first detection current threshold.

t2: the voltage of the second detection signal YN is lower than a second detection voltage threshold, both the second driving signal SB and the fourth driving signal SD are turned off.

t3-t4: a current is started to flow from the live wire VL to the neutral wire VN (also referring to FIG. 5). The first driving signal SA, the second driving signal SB, the third driving signal SC and the fourth driving signal SD are disabled. The body diode 15 and the body diode 35 are turned on. The second detection transistor 60 is turned on because the voltage of the second detection signal YN is lower than the second detection voltage threshold, which indicates a current starts to flow through the body diode 35. The level of the second detection signal YN is lower than a second low-side voltage threshold.

t4: the voltage of the first detection signal XL is higher than a first detection voltage threshold, and the level of the second detection signal YN is lower than the second low-side voltage threshold. Therefore, the third driving signal SC is enabled to turn on the second low-side transistor 30, since there is no current flowing through the first low-side transistor 40 (XL being higher than a first detection voltage threshold) and a current sufficiently large starts to flow through the body diode 35. Note that it is prevented to turn on both the first low-side transistor 40 and the second low-side transistor 30 at the same time. Also note that the period t2-t4 provides a dead time TDT to prevent the transistors 10, 20, 30, 40 from shorting-through.

t4-t5: the third driving signal SC is enabled to turn on the second low-side transistor 30. Once the third driving signal SC is enabled and after a delay TD, the first driving signal SA is enabled to turn on the first high-side transistor 10. A current IVL will flow from the live wire VL sequentially through the first high-side transistor 10, the DC power source VBD, the resistive load 80, ground, the second low-side transistor 30, and the neutral wire VN (as shown in FIG. 5). The current IVL and the on-resistance R30 of the second low-side transistor 30 generates a negative drain-source voltage of the second low-side transistor 30 during t4-t5. The second low-side transistor 30 is turned off when the current IVL is lower than a second detection current threshold.

The first low-side transistor 40 is turned off when there is a current flowed from the live wire VL to the neutral wire VN, which prevents a reversed current which has a reverse direction which is opposite to the forward conduction direction of the body diode 45 (considered as a rectifier diode). The second low-side transistor 30 is turned off when there is a current flowed from the neutral wire VN to the live wire VL. Furthermore, the first low-side transistor 40 is turned off when there is a current flowed from a drain terminal of the first low-side transistor 40 to a source terminal of the first low-side transistor 40. The second low-side transistor 30 also is turned off when there is a current flowed from a drain terminal of the second low-side transistor 30 to a source terminal of the second low-side transistor 30. From a perspective, current flowed from the drain terminal to the source terminal is forbidden for the transistors 10, 20, 30, 40 according to the present invention.

t5: The first high-side transistor 10 and the second low-side transistor 30 are turned off with similar reasons as on the time point t2. Switching operation repeats from t6-t7 and later as from t0-t1.

Figure 6:
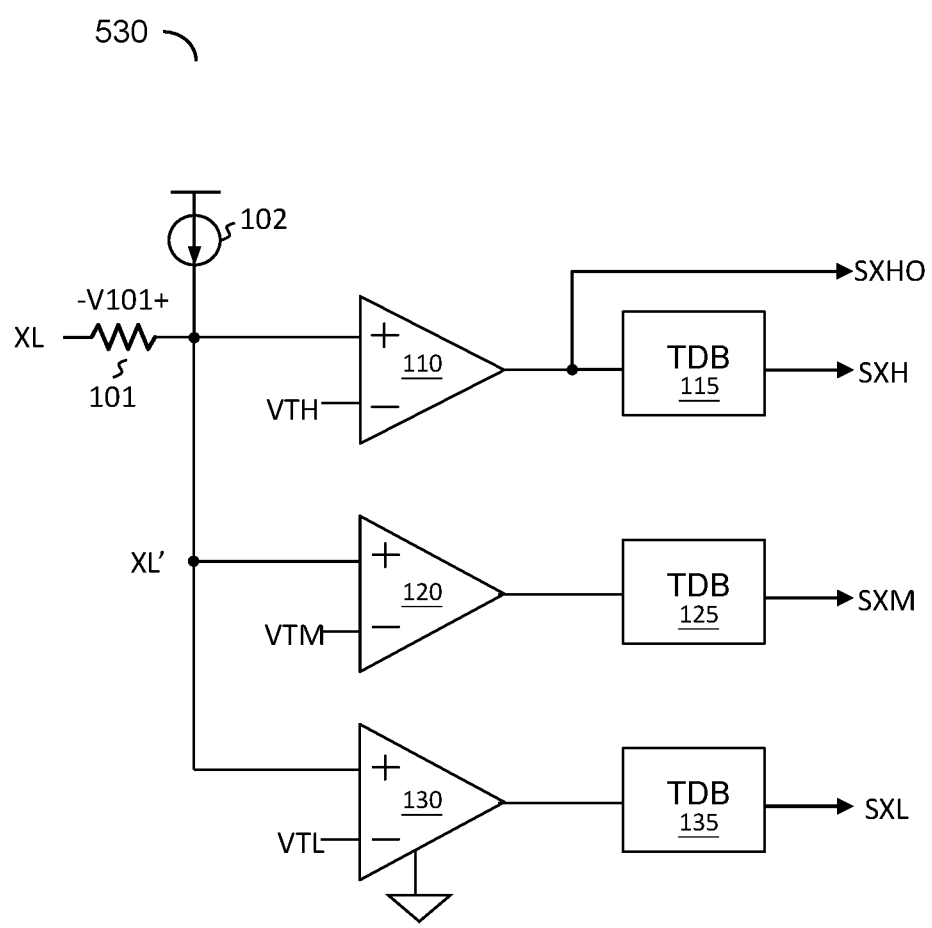
FIG. 6 shows a schematic diagram of a preferred embodiment of the first detection circuit according to the present invention.

FIG. 6 shows a schematic diagram of a preferred embodiment of the first detection circuit according to the present invention. A constant current source 102 generates a bias voltage V101 at a resistor 101. Comparators 110, 120 and 130 are configured to operably compare with the first detection signal XL through the resistor 101. The comparator 110 has a voltage threshold VTH. The comparator 120 has a voltage threshold VTM. The comparator 130 has a voltage threshold VTL. The aforementioned at least one first reference signal is related to the voltage threshold VTH, the voltage threshold VTM and the voltage threshold VTL.

The first detection voltage threshold=VTH−V101.
The first detection current threshold=(VTM−V101)/R40
The first low-side voltage threshold=VTL−V101

Note that the bias voltage V101 is utilized for providing a positive detection signal XL', equal to XL+V101, for the aforementioned comparators 110-130 to compare so that the threshold voltages VTH, VTM, VTL can be non-negative values, which simplifies the design of the comparators. Note that, in one embodiment, the first detection voltage threshold is higher than the first low-side voltage threshold.

The comparator 110 is configured to operably generate a signal SXH0 which is enabled when the first detection signal XL is higher than the first detection voltage threshold. The signal SXH0 is further de-bounced by a debounce circuit 115 to generate a signal SXH. The comparator 120 and a debounce circuit 125 enable a signal SXM once the current backward (source terminal-to-drain terminal) flowed through the first low-side transistor 40 is lower than the first detection current threshold. The comparator 130 and a debounce circuit 135 disables (e.g. from high to low) a signal SXL once the first detection signal XL is lower than the first low-side voltage threshold.

Figure 7:
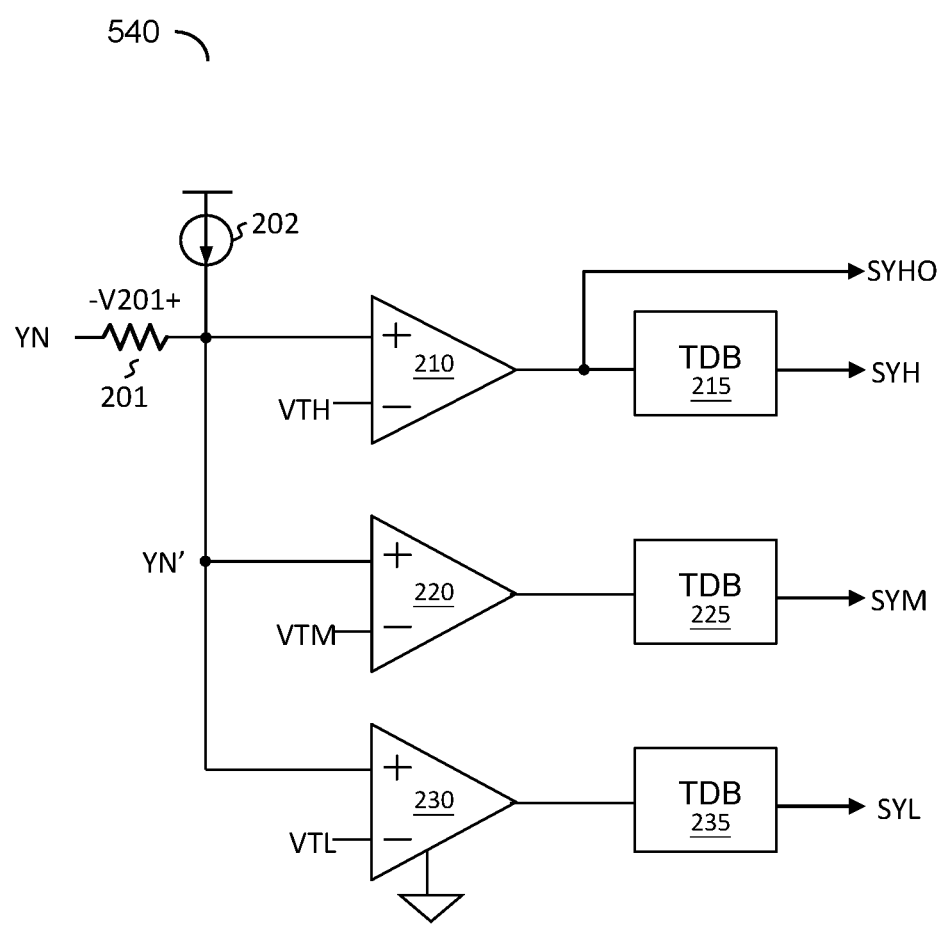
FIG. 7 shows a schematic diagram of a preferred embodiment of the second detection circuit according to the present invention.

FIG. 7 shows a schematic diagram of a preferred embodiment of the second detection circuit according to the present invention. A constant current source 202 generates a bias voltage V201 at a resistor 201. Comparators 210, 220 and 230 are configured to operably compare with the second detection signal YN through the resistor 201. The comparator 210 has the voltage threshold VTH. The comparator 220 has the voltage threshold VTM. The comparator 230 has the voltage threshold VTL. The at least one second reference signal is corresponded to the voltage threshold VTH, the voltage threshold VTM and the voltage threshold VTL.

The second detection voltage threshold=VTH−V201.
The second detection current threshold=(VTM−V201)/R30
The second low-side voltage threshold=VTL−V201

Note that the bias voltage V201 is utilized for providing a positive detection signal YN', equal to YN+V201, for the aforementioned comparators 210-230 to compare so that the threshold voltages VTH, VTM, VTL can be non-negative values, which simplifies the design of the comparators. Note that, in one embodiment, the second detection voltage threshold is higher than the second low-side voltage threshold.

The comparator 210 is configured to operably generate a signal SYH0 which is enabled when the second detection signal YN is higher than the second detection voltage threshold. The signal SYH0 further generates a signal SYH through a debounce circuit 215. The comparator 220 and a debounce circuit 225 enable a signal SYM once the current backward (source terminal-to-drain terminal) flowed through the second low-side transistor 30 is lower than the second detection current threshold. The comparator 230 and a debounce circuit 235 disables (e.g. from high to low) a signal SYL once the second detection signal YN is lower than the second low-side voltage threshold.

Figure 8:
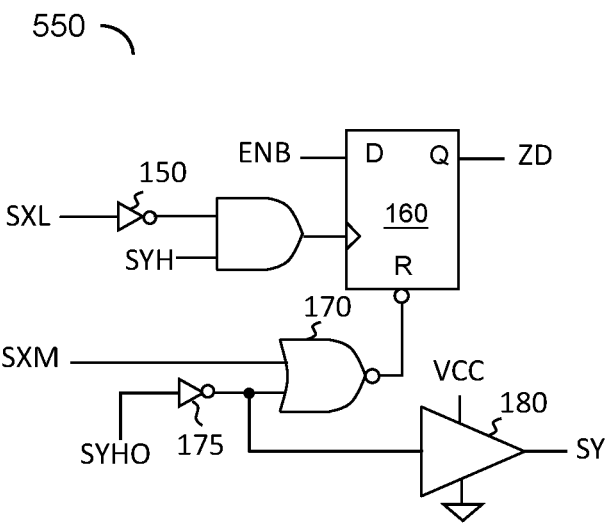
FIG. 8 shows a schematic diagram of a preferred embodiment of the first decision circuit according to the present invention.

FIG. 8 shows a schematic diagram of a preferred embodiment of the first decision circuit according to the present invention. A first low-side control signal ZD is configured to operably control an on-time of the first low-side transistor 40. The first low-side control signal ZD is configured to operably turn on the first low-side transistor 40 when the following conditions (1)-(3) are satisfied: (1) when the signal SYH is enabled (e.g. logic-high, i.e. the voltage of the second detection signal YN is higher than a second detection voltage threshold); and (2) when the signal SXL is disabled (e.g. logic-low, i.e. the body diode 45 is turned on, thus the voltage of the first detection signal XL is lower than the first low-side voltage threshold); and (3) when the enable signal ENB is enabled (e.g. logic-high, i.e. for the non-light-load condition).

The first low-side control signal ZD is disabled (e.g. logic-low) and is configured to operably turn off the first low-side transistor 40 when one of following condition occurs: (1) when the signal SXM is enabled (e.g. logic-high, i.e. the current backward flowed through the first low-side transistor 40 is lower than the first detection current threshold); or (2) when the signal SYH0 is disabled (e.g. logic-low, i.e. the voltage of the second detection signal YN is lower than the second detection voltage threshold).

A second detection control signal SY is generated by a buffer 180 to turn on the second detection transistor 60 when the voltage of the second detection signal YN is lower than the second detection voltage threshold (e.g. the signal SYH0 is logic-low).

Figure 9:
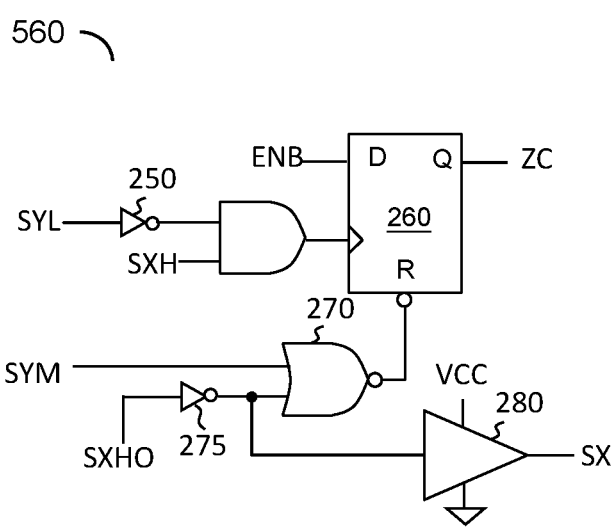
FIG. 9 shows a schematic diagram of a preferred embodiment of the second decision circuit according to the present invention.

FIG. 9 shows a schematic diagram of a preferred embodiment of the second decision circuit according to the present invention. A second low-side control signal ZC is configured to operably control an on-time of the second low-side transistor 30. The second low-side control signal ZC is configured to operably turn on the second low-side transistor 30 when the following conditions (1)-(3) are satisfied: (1) when the signal SXH is enabled (e.g. logic-high, i.e. the voltage of the first detection signal XL is higher than a first detection voltage threshold); and (2) when the signal SYL is disabled (e.g. logic-low, i.e. the body diode 35 is turned on, thus the voltage of the second detection signal YN is lower than the second low-side voltage threshold); and (3) when the enable signal ENB is enabled (e.g. logic-high, i.e. for the non-light-load condition).

The second low-side control signal ZC is disabled (e.g. logic-low) and is configured to operably turn off the second low-side transistor 30 when one of following condition occurs: (1) when the signal SYM is enabled (e.g. logic-high, i.e. the current backward flowed through the second low-side transistor 30 is lower than the second detection current threshold); or (2) when the signal SXH0 is disabled (e.g. logic-low, i.e. the voltage of the first detection signal XL is lower than the first detection voltage threshold).

A first detection control signal SX is generated by a buffer 280 to turn on the first detection transistor 50 when the voltage of the first detection signal XL is lower than the first detection voltage threshold (e.g. the signal SXH0 is logic-low). Note that power loss can be further reduced when first detection transistor 50 or the second detection transistor 60 is turned off.

Figure 10:
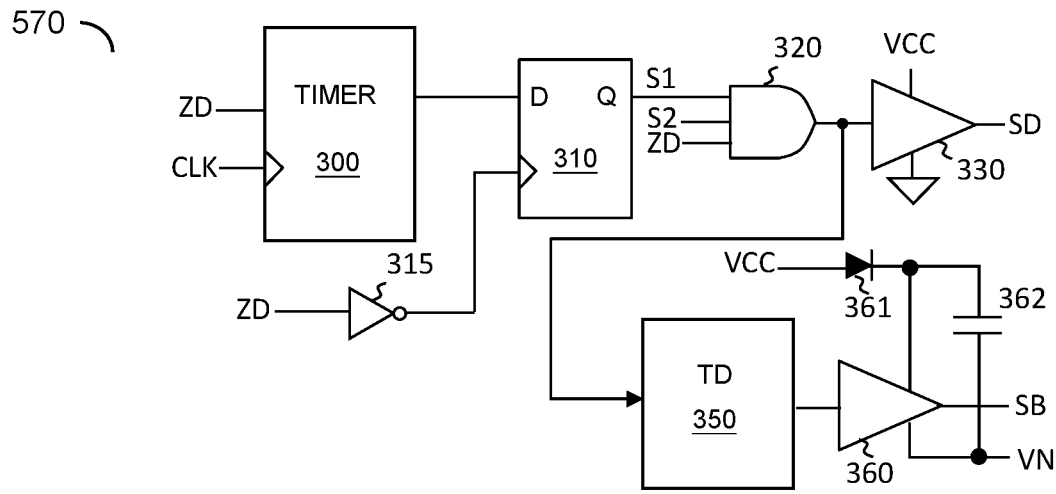
FIG. 10 shows a preferred embodiment of a timing control circuit according to one embodiment of the present invention.
Figure 10:
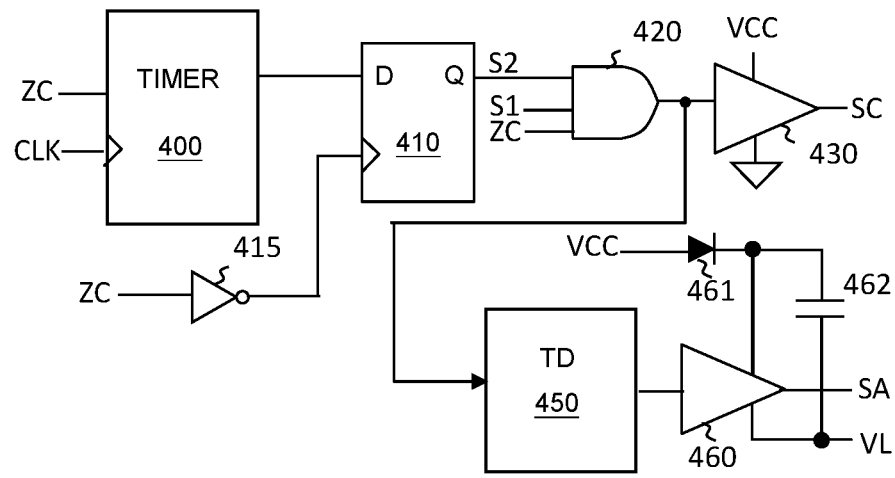

FIG. 10 shows a preferred embodiment of a timing control circuit 570 according to one embodiment of the present invention. The timing control circuit 570 is configured to generate the first driving signal SA, the second driving signal SB, the third driving signal SC and the fourth driving signal SD according to the first low-side control signal ZD and the second low-side control signal ZC. The first driving signal SA, the second driving signal SB, the third driving signal SC and the fourth driving signal SD is configured to be disabled when the pulse width TW (shown in FIG. 3) of the third driving signal SC or the fourth driving signal SD is shorter than a period threshold. Note that when the pulse width TW of the third driving signal SC or the fourth driving signal SD is shorter than a period threshold indicates the load is low, for example when the PFC converter is turned off during the burst switching or the light load conditions. The period threshold of the fourth driving signal SD and the third driving signal SC are determined by the timer 300 and timer 400 respectively (e.g., timing according to the clock signal CLK). Turning off the first driving signal SA, the second driving signal SB, the third driving signal SC and the fourth driving signal SD during the light load condition can save the power by reducing the switching loss. The third driving signal SC is generated in accordance with the second low-side control signal ZC. The fourth driving signal SD is generated in accordance with the first low-side control signal ZD. The first driving signal SA is generated to turn on the first high-side transistor 10, after a delay time TD (provided by delay cell 450) once the third driving signal SC is generated. The second driving signal SB is generated to turn on the second high-side transistor 20, after a delay time TD (provided by delay cell 350) once the fourth driving signal SD is generated. A bootstrap diode 361 and a capacitor 362 provide the power source for a high-side gate driver 360 to drive the second high-side transistor 20. A bootstrap diode 461 and a capacitor 462 provide the power source for a high-side gate driver 460 to drive the first high-side transistor 10.

Figure 11:
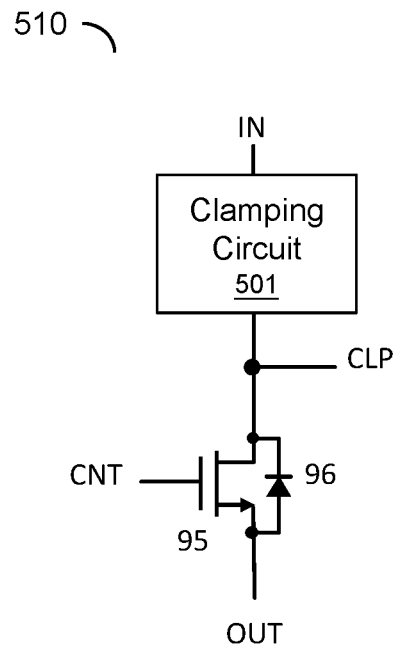
FIG. 11A shows a schematic diagram of a preferred embodiment of the detection switch circuit according to the present invention.
FIG. 11B shows a schematic diagram of a preferred embodiment of the detection switch circuit according to the present invention.
Figure 11:
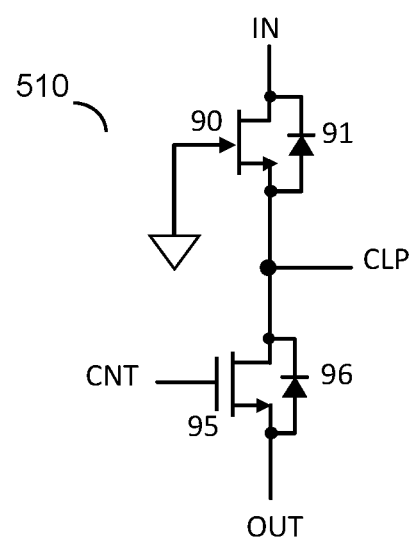

FIG. 11A shows a schematic diagram of a preferred embodiment of the detection switch circuit according to the present invention. The detection switch circuit 510 can be corresponded to the first detection switch circuit 511 or the second detection switch circuit 512. The input terminal IN is corresponded to the live wire VL or neutral wire VN. The control terminal CNT is corresponded to the first detection control signal SX or the second detection control signal SY. The output terminal OUT is corresponded to the first detection signal XL or the second detection signal YN.

As shown in FIG. 11A, in one embodiment, the detection switch circuit 510 includes a clamping circuit 501 and a low-voltage MOSFET 95 having a body diode 96. The low-voltage MOSFET 95 is corresponded to the first detection transistor 50 or the second detection transistor 60.

The clamping circuit 501 is configured to clamp the drain voltage of the low-voltage MOSFET 95 under the aforementioned clamping voltage, such that the maximum voltage of the second detection voltage YN are clamped under the clamping voltage. In one embodiment, the clamping voltage is lower than a maximum rating voltage of low-voltage MOSFET 95.

As shown in FIG. 11B, in one embodiment, the detection switch circuit 510 includes a JFET 90 having a body diode 91 and the low-voltage MOSFET 95. The JFET 90 cascodes a low-voltage MOSFET 95, and is configured to clamp the drain voltage of the low-voltage MOSFET 95 under the aforementioned clamping voltage.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A synchronous full-bridge rectifier circuit comprising:
    a first high-side transistor, a first low-side transistor, a second high-side transistor and a second low-side transistor which are configured to operably generate a DC power source from an AC power source, wherein the first high-side transistor and the first low-side transistor are connected and coupled to a live wire of the AC power source, and the second high-side transistor and the second low-side transistor are connected and coupled to a neutral wire of the AC power source;
    a first detection transistor, coupled to the live wire and configured to operably generate a first detection signal;
    a second detection transistor, coupled to the neutral wire configured to operably generate a second detection signal; and
    a switching control circuit, configured to operably generate a first driving signal, a second driving signal, a third driving signal and a fourth driving signal according to the first detection signal and the second detection signal;
    wherein the first driving signal is configured to operably control the first high-side transistor; the second driving signal is configured to operably control the second high-side transistor; the third driving signal is configured to operably control the second low-side transistor; the fourth driving signal is configured to operably control the first low-side transistor;
    wherein the first low-side transistor is turned on after a body-diode of the first low-side transistor is turned on; the second low-side transistor is turned on after the body-diode of the second low-side transistor is turned on.

2. The synchronous full-bridge rectifier circuit of claim 1, wherein a maximum voltage of the first detection signal and a maximum voltage of the second detection signal are clamped to be not more than a clamping voltage.

3. The synchronous full-bridge rectifier circuit of claim 2, wherein the first detection transistor or the second detection transistor is a MOSFET.

4. The synchronous full-bridge rectifier circuit of claim 3, wherein the synchronous full-bridge rectifier circuit further comprises a first clamping transistor which is cascoded between the first detection transistor and the live wire such that the maximum voltage of the first detection signal is clamped to be not more than the clamping voltage, wherein the first clamping transistor is a JFET, wherein the clamping voltage is lower than a maximum rating voltage of the first detection transistor; and/or
    wherein the synchronous full-bridge rectifier circuit further comprises a second clamping transistor which is cascoded between the second detection transistor and the neutral wire such that the maximum voltage of the second detection signal is clamped to be not more than the clamping voltage, wherein the second clamping transistor is a JFET, wherein the clamping voltage is lower than a maximum rating voltage of the second detection transistor.

5. The synchronous full-bridge rectifier circuit of claim 1, wherein the first driving signal is enabled to turn on the first high-side transistor after the third driving signal is enabled, and the second driving signal is enabled to turn on the second high-side transistor after the fourth driving signal is enabled.

6. The synchronous full-bridge rectifier circuit of claim 1, wherein the first low-side transistor is turned off when current flowing from the neutral wire to the live wire is lower than a first detection current threshold.

7. The synchronous full-bridge rectifier circuit of claim 1, wherein the second low-side transistor is turned off when current flowing from the live wire to the neutral wire is lower than a second detection current threshold.

8. The synchronous full-bridge rectifier circuit of claim 1, wherein the first low-side transistor is turned off when there is a current flowing from the live wire to the neutral wire; wherein the second low-side transistor is turned off when there is a current flowing from the neutral wire to the live wire.

9. The synchronous full-bridge rectifier circuit of claim 1, wherein the first low-side transistor is turned off when there is a current flowing from a drain terminal of the first low-side transistor to a source terminal of the first low-side transistor; wherein the second low-side transistor is turned off when there is a current flowing from a drain terminal of the second low-side transistor to a source terminal of the second low-side transistor.

10. The synchronous full-bridge rectifier circuit of claim 1, wherein the first low-side transistor is allowed be turned on when a voltage of the first detection signal is lower than a first low-side voltage threshold.

11. The synchronous full-bridge rectifier circuit of claim 1, wherein the second low-side transistor is allowed be turned on when a voltage of the second detection signal is lower than a second low-side voltage threshold.

12. The synchronous full-bridge rectifier circuit of claim 1, wherein the second low-side transistor is allowed be turned on when a voltage of the first detection signal is higher than a first detection voltage threshold; wherein the first low-side transistor is allowed be turned on when a voltage of the second detection signal is higher than a second detection voltage threshold.

13. The synchronous full-bridge rectifier circuit of claim 1, wherein the second low-side transistor is turned off when a voltage of the first detection signal is lower than a first detection voltage threshold; wherein the first low-side transistor is turned off when a voltage of the second detection signal is lower than a second detection voltage threshold.

14. The synchronous full-bridge rectifier circuit of claim 1, wherein the first detection transistor is allowed be turned on when a voltage of the first detection signal is lower than a first detection voltage threshold; wherein the second detection transistor is allowed be turned on when a voltage of the second detection signal is lower than a second detection voltage threshold.

15. The synchronous full-bridge rectifier circuit of claim 1, wherein the first high-side transistor, the first low-side transistor, the second high-side transistor and the second low-side transistor are turned off when a pulse width of the third driving signal or the fourth driving signal is shorter than a period threshold;
wherein the pulse width of the third driving signal or the fourth driving signal being shorter than the period threshold indicates a load consuming the DC power source is lower than a load threshold.

16. The synchronous full-bridge rectifier circuit of claim 1, wherein the first high-side transistor, the first low-side transistor, the second high-side transistor and the second low-side transistor are turned off when an enable signal is disabled during a light load condition.

17. A rectifier switch controller for use in controlling a synchronous full-bridge rectifier circuit which includes: a first high-side transistor, a first low-side transistor, a second high-side transistor and a second low-side transistor which are configured to operably generate a DC power source from an AC power source, wherein the first high-side transistor and the first low-side transistor are connected and coupled to a live wire of the AC power source, and the second high-side transistor and the second low-side transistor are connected and coupled to a neutral wire of the AC power source, the rectifier switch controller comprising:
a first detection transistor, coupled to the live wire and configured to operably generate a first detection signal;
a second detection transistor, coupled to the neutral wire configured to operably generate a second detection signal;
a first detection circuit, configured to compare the first detection signal with at least one first reference signal to generate at least one first comparison signal correspondingly;
a second detection circuit, configured to compare the second detection signal with at least one second reference signal to generate at least one second comparison signal correspondingly;
a first decision circuit, configured to operably generate a first low-side control signal according to the at least one first comparison signal and the at least one second comparison signal, wherein an on-time of the first low-side transistor is determined according to the first low-side control signal;
a second decision circuit, configured to operably generate a second low-side control signal according to the at least one second comparison signal and the at least one first comparison signal, wherein an on-time of the second low-side transistor is determined according the to second low-side control signal; and
a timing control circuit, configured to operably generate a first driving signal, a second driving signal, a third driving signal and a fourth driving signal according to the first low-side control signal and the second low-side control signal;
wherein the first driving signal is configured to operably control the first high-side transistor; the second driving signal is configured to operably control the second high-side transistor; the third driving signal is configured to operably control the second low-side transistor; the fourth driving signal is configured to operably control the first low-side transistor;
wherein the first low-side transistor is turned on after a body-diode of the first low-side transistor is turned on; the second low-side transistor is turned on after a body-diode of the second low-side transistor is turned on.

18. The rectifier switch controller of claim 17, wherein a maximum voltage of the first detection signal and a maximum voltage of the second detection signal are clamped to be not more than a clamping voltage.

19. The rectifier switch controller of claim 18, wherein the first detection transistor or the second detection transistor is a MOSFET.

20. The rectifier switch controller of claim 18, wherein the rectifier switch controller further comprises a first clamping transistor which is cascoded between the first detection transistor and the live wire such that the maximum voltage of the first detection signal is clamped to be not more than the clamping voltage, wherein the first clamping transistor is a JFET, wherein the clamping voltage is lower than a maximum rating voltage of the first detection transistor; and/or
wherein the rectifier switch controller further comprises a second clamping transistor which is cascoded between the second detection transistor and the neutral wire such that the maximum voltage of the second detection signal is clamped to be not more than the clamping voltage, wherein the second clamping transistor is a JFET, wherein the clamping voltage is lower than a maximum rating voltage of the second detection transistor.

21. The rectifier switch controller of claim 17, wherein the first driving signal is enabled to turn on the first high-side transistor after the third driving signal is enabled, and the second driving signal is enabled to turn on the second high-side transistor after the fourth driving signal is enabled.

22. The rectifier switch controller of claim 17, wherein the first detection circuit is configured to compare the first detection signal with a middle voltage threshold, wherein the first low-side transistor is turned off when the first detection signal is higher than the middle voltage threshold, which indicates that a current flowing from the neutral wire to the live wire is lower than a first detection current threshold.

23. The rectifier switch controller of claim 17, wherein the second detection circuit is configured to compare the second detection signal with a middle voltage threshold, wherein the second low-side transistor is turned off when the second detection signal is higher than the middle voltage threshold, which indicates that a current flowing from the live wire to the neutral wire is lower than a second detection current threshold.

24. The rectifier switch controller of claim 17, wherein the second detection circuit is configured to compare the second detection signal with a second detection voltage threshold, wherein the first low-side transistor is turned off when the second detection signal is lower than the second detection voltage threshold, which indicates that there is a current flowing from the live wire to the neutral wire; wherein the first detection circuit is configured to compare the first detection signal with a first detection voltage threshold, wherein the second low-side transistor is turned off when the first detection signal is lower than the first detection voltage threshold, which indicates that there is a current flowing from the neutral wire to the live wire.

25. The rectifier switch controller of claim 17, wherein the first detection circuit is configured to compare the first detection signal with a first low-side voltage threshold, wherein the first low-side transistor is turned off when there is a current flowing from a drain terminal of the first low-side transistor to a source terminal of the first low-side transistor; wherein the second detection circuit is configured to compare the second detection signal with a second low-side voltage threshold, wherein the second low-side transistor is turned off when there is a current flowing from a drain terminal of the second low-side transistor to a source terminal of the second low-side transistor.

26. The rectifier switch controller of claim 17, wherein the first detection circuit is configured to compare the first detection signal with a first low-side voltage threshold, wherein the first low-side transistor is allowed be turned on when a voltage of the first detection signal is lower than the first low-side voltage threshold.

27. The rectifier switch controller of claim 17, wherein the second detection circuit is configured to compare the second detection signal with a second low-side voltage threshold, wherein the second low-side transistor is allowed be turned on when a voltage of the second detection signal is lower than the second low-side voltage threshold.

28. The rectifier switch controller of claim 17, wherein the second detection circuit is configured to compare the second detection signal with a second detection voltage threshold, wherein the first low-side transistor is allowed be turned on when a voltage of the second detection signal is higher than the second detection voltage threshold.

29. The rectifier switch controller of claim 28, wherein the first detection circuit is configured to further compare the first detection signal with a middle voltage threshold, and compare the first detection signal with a first low-side voltage threshold, the wherein first low-side transistor is turned on when the voltage of the second detection signal is higher than the second detection voltage threshold, a voltage of the first detection signal is lower than the middle voltage threshold, and a voltage of the first detection signal is lower than the first low-side voltage threshold.

30. The rectifier switch controller of claim 17, wherein the first detection circuit is configured to compare the first detection signal with a first detection voltage threshold, wherein the second low-side transistor is allowed be turned on when a voltage of the first detection signal is higher than the first detection voltage threshold.

31. The rectifier switch controller of claim 30, wherein the second detection circuit is configured to further compare the second detection signal with a middle voltage threshold, and compare the second detection signal with a second low-side voltage threshold, wherein the second low-side transistor is turned on when the voltage of the first detection signal is higher than the first detection voltage threshold, a voltage of the second detection signal is lower than the middle voltage threshold, and a voltage of the second detection signal is lower than the second low-side voltage threshold.

32. The rectifier switch controller of claim 17, wherein the first detection circuit is configured to compare first detection signal with a first detection voltage threshold, wherein the second detection circuit is configured to compare the second detection signal with a second detection voltage threshold, wherein the first detection transistor is allowed be turned on when a voltage of the first detection signal is lower than the first detection voltage threshold; wherein the second detection transistor is allowed be turned on when a voltage of the second detection signal is lower than the second detection voltage threshold.

33. The rectifier switch controller of claim 17, wherein the timing control circuit includes at least one timer which is configured to count a pulse width of the third driving signal or the fourth driving signal according to a clock signal, wherein the first high-side transistor, the first low-side transistor, the second high-side transistor and the second low-side transistor are turned off when the pulse width of the third driving signal or the fourth driving signal is shorter than a period threshold provided by the at least one timer;
  wherein the pulse width of the third driving signal or the fourth driving signal being shorter than the period threshold indicates a load consuming the DC power source is lower than a load threshold.

34. The rectifier switch controller of claim 17, wherein the first high-side transistor, the first low-side transistor, the second high-side transistor and the second low-side transistor are turned off when an enable signal is disabled during a light load condition.

35. The rectifier switch controller of claim 17, wherein the first decision circuit prevents both the first low-side transistor and the second low-side transistor from turning on at the same time according to the at least one second comparison signal, wherein the second decision circuit prevents both the first low-side transistor and the second low-side transistor from turning on at the same time according to the at least one first comparison signal.

* * * * *